US012736401B2

(12) United States Patent
Tanaka

(10) Patent No.: US 12,736,401 B2
(45) Date of Patent: Sep. 15, 2026

(54) CONTROL DEVICE, CONTROL SYSTEM, AND CONTROL PROGRAM

(71) Applicant: SEIKO EPSON CORPORATION, Tokyo (JP)

(72) Inventor: Katsuya Tanaka, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 34 days.

(21) Appl. No.: 18/935,534

(22) Filed: Nov. 3, 2024

(65) Prior Publication Data

US 2025/0146867 A1 May 8, 2025

(30) Foreign Application Priority Data

Nov. 2, 2023 (JP) ................................ 2023-188221

(51) Int. Cl.
*G01J 3/02* (2006.01)

(52) U.S. Cl.
CPC ............ *G01J 3/0264* (2013.01); *G01J 3/027* (2013.01)

(58) Field of Classification Search
CPC ... G01J 3/0264; G01J 3/027; H04W 52/0251; H04W 4/00; G01N 21/251; G06F 1/3209; G06F 1/3228; G06F 3/04847; H04L 67/125; H04M 1/72412
See application file for complete search history.

(56) References Cited

U.S. PATENT DOCUMENTS

2008/0165829 A1* 7/2008 Lee ......................... H04W 4/80 375/130
2013/0111228 A1* 5/2013 Hashimoto ........... G06F 1/3228 713/300
2022/0316947 A1 10/2022 Morimoto et al.

FOREIGN PATENT DOCUMENTS

JP 2022153718 A 10/2022

* cited by examiner

*Primary Examiner* — Tony Ko
(74) *Attorney, Agent, or Firm* — CHIP LAW GROUP

(57) ABSTRACT

A smartphone includes a communication I/F that communicates with a target device, a first setting unit that sets a first communication condition that is a condition for transition of the communication I/F from an active state communicating with the target device to a dormant state that does not communicate with the target device, an acquisition unit that acquires from the target device a second communication condition that is a condition of transition from an active state communicating with the communication I/F to a dormant state that does not communicate with the communication I/F, and a display control unit that controls a touch panel, and when the first setting unit receives a first change operation that makes difficult for the communication I/F to transition from the active state to the dormant state, the display control unit causes information indicating the second communication condition to be displayed on the touch panel.

9 Claims, 8 Drawing Sheets

CONTROL DEVICE, CONTROL SYSTEM, AND CONTROL PROGRAM

The present application is based on, and claims priority from JP Application Serial Number 2023-188221, filed Nov. 2, 2023, the disclosure of which is hereby incorporated by reference herein in its entirety.

BACKGROUND

1. Technical Field

The present disclosure relates to a control device, a control system, and a control program.

2. Related Art

In the related art, a colorimeter that communicates with a smartphone is known.

For example, a colorimeter described in JP-A-2022-153718 achieves low power consumption by switching between Wi-Fi (registered trademark) communication and Bluetooth (registered trademark) communication depending on a colorimetric mode.

However, communication between a target device such as the colorimeter described in JP-A-2022-153718 and a control device such as a smartphone may be disconnected without a user's intention.

For example, when the smartphone transitions to a sleep state, communication between the smartphone and the colorimeter may be disconnected without a user's intention. Further, for example, when the colorimeter has not been operated continuously for a predetermined period of time or more, the colorimeter may be powered off, and communication between the smartphone and the colorimeter may be disconnected without a user's intention.

Therefore, it is necessary to curb disconnection of communication between the target device and the control device without a user's intention.

SUMMARY

An aspect solving the problem is a control device including a first communication unit configured to communicate with a target device, a first setting unit configured to set a first communication condition, the first communication condition being a condition of transition of the first communication unit from an active state in which the first communication unit communicates with the target device to a dormant state in which the first communication unit does not communicate with the target device, in response to an operation from a user, an acquisition unit configured to acquire a second communication condition from the target device, the second communication condition being a condition of transition from an active state in which the target device communicates with the first communication unit to a dormant state in which the target device does not communicate with the first communication unit, and a display control unit configured to control a display unit, wherein when the first setting unit receives a first change operation being an operation for changing a setting of the first communication condition to make it difficult for the first communication unit to transition from the active state to the dormant state, the display control unit causes the display unit to display information indicating the second communication condition.

Another aspect solving the problem is a control system including a target device and a control device configured to control the target device, wherein the target device includes a second communication unit, and the control device includes a first communication unit configured to communicate with the second communication unit, a first setting unit configured to set a first communication condition, the first communication condition being a condition of transition of the first communication unit from an active state in which the first communication unit communicates with the target device to a dormant state in which the first communication unit does not communicate with the target device, in response to an operation from a user, an acquisition unit configured to acquire a second communication condition from the second communication unit, the second communication condition being a condition of transition from an active state in which the second communication unit communicates with the first communication unit to a dormant state in which the second communication unit does not communicate with the first communication unit, and a display control unit configured to control a display unit, and when the first setting unit receives a first change operation being an operation for changing a setting of the first communication condition to make it difficult for the first communication unit to transition from the active state to the dormant state, the display control unit causes the display unit to display information indicating the second communication condition.

Yet another aspect solving the problem is a non-transitory computer-readable storage medium storing a control program for causing a processor for controlling a first communication unit communicating with a target device to function as a first setting unit configured to set a first communication condition, the first communication condition being a condition of transition of the first communication unit from an active state in which the first communication unit communicates with the target device to a dormant state in which the first communication unit does not communicate with the target device, in response to an operation from a user, an acquisition unit configured to acquire a second communication condition from the target device, the second communication condition being a condition of transition from an active state in which the target device communicates with the first communication unit to a dormant state in which the target device does not communicate with the first communication unit, and a display control unit configured to control a display unit, and when the first setting unit receives a first change operation being an operation for changing a setting of the first communication condition to make it difficult for the first communication unit to transition from the active state to the dormant state, the display control unit causes the display unit to display information indicating the second communication condition.

BRIEF DESCRIPTION OF THE DRAWINGS

FIG. 3 is a screen diagram illustrating an example of an application setting screen displayed by a touch panel.

FIG. 5 is a screen diagram illustrating an example of a colorimeter setting screen displayed by the touch panel.

DESCRIPTION OF EMBODIMENTS

Hereinafter, embodiments will be described with reference to the drawings.

Figure 1:
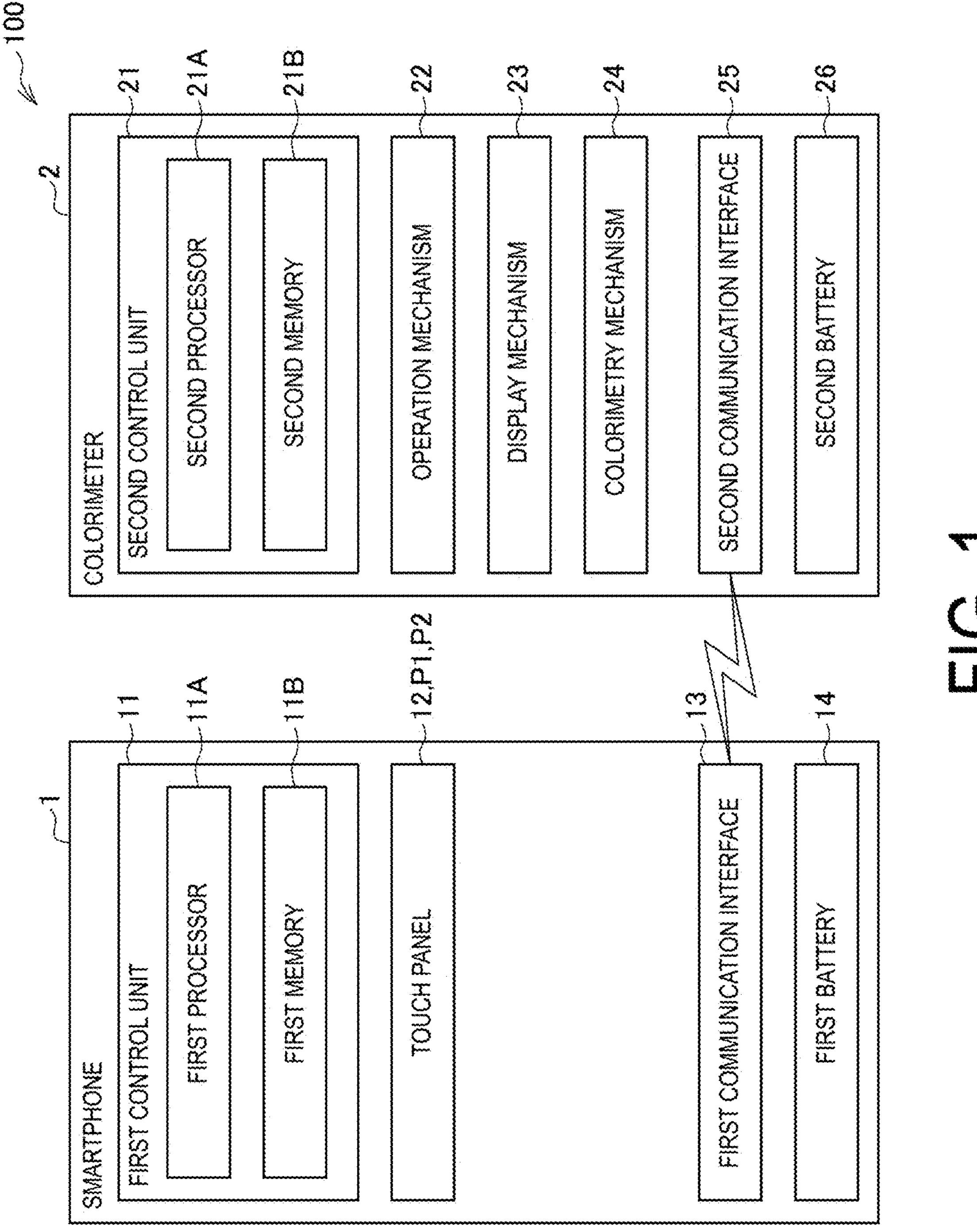
FIG. 1 is a diagram illustrating an example of a control system according to the present embodiment.

First, a configuration of a control system 100 will be described with reference to FIG. 1. FIG. 1 is a diagram illustrating an example of the control system 100 according to the present embodiment. As illustrated in FIG. 1, the control system 100 includes a smartphone 1 and a colorimeter 2. The smartphone 1 and the colorimeter 2 are coupled so that the smartphone 1 and the colorimeter 2 can perform wireless communication.

The smartphone 1 transmits various types of instruction information to the colorimeter 2. The colorimeter 2 operates according to an instruction from the smartphone 1.

The smartphone 1 corresponds to an example of a "control device".

The colorimeter 2 corresponds to an example of a "target device".

As illustrated in FIG. 1, the smartphone 1 includes a first control unit 11, a touch panel 12, a first communication interface 13, and a first battery 14. The first battery 14 supplies power to each unit of the smartphone 1. The first control unit 11 controls each unit of the smartphone 1. The touch panel 12 and the first communication interface 13 are communicatively coupled to the first control unit 11.

The first control unit 11 includes a first processor 11A such as a central processing unit (CPU), and a first memory 11B such as a read only memory (ROM). The first memory 11B stores a first control program PG1.

The first processor 11A may be configured of a plurality of processors or may be configured of a single processor.

The first processor 11A may be hardware programmed to realize a function of each unit to be described below. That is, the first processor 11A may be configured to include the first control program PG1 installed as a hardware circuit. In this case, for example, the first processor 11A is configured as an application specific integrated circuit (ASIC), a field-programmable gate array (FPGA), or the like.

In the following description, a case where the first processor 11A executes the first control program PG1 to realize various functions of the first control unit 11 will be described.

The first memory 11B includes a storage area for storing programs that are executed by the first processor 11A and data that is processed by the first processor 11A. The first memory 11B stores the first control program PG1 that is executed by the first processor 11A, and various types of image data, setting data, and the like related to an operation of the smartphone 1.

The first memory 11B includes a non-volatile storage area for storing programs and data in a non-volatile manner. The first memory 11B may include, for example, a ROM, a hard disk drive (HDD), or a solid state drive (SSD) as the non-volatile storage area. Further, the first memory 11B may include a volatile storage area and constitute a work area for temporarily storing programs that are executed by the first processor 11A and processing target data. The first memory 11B may include, for example, a random access memory (RAM) as the volatile storage area.

The touch panel 12 includes a display panel such as a liquid crystal display (LCD), and a touch sensor formed integrally with a display surface of the display panel. The display panel displays various images under the control of the first control unit 11. The display panel displays, for example, an application setting screen 300 illustrated in FIG. 3 and a colorimeter setting screen 400 illustrated in FIG. 4.

Further, the touch sensor receives an operation from a user. The touch sensor generates a signal corresponding to the operation received from the user and outputs the generated signal to the first control unit 11. The touch sensor detects, for example, an operation with respect to the application setting screen 300 illustrated in FIG. 3, generates a signal corresponding to the operation, and outputs the generated signal to the first control unit 11.

The touch panel 12 corresponds to an example of a "display unit".

The first communication interface 13 is a communication interface that executes wireless communication with the colorimeter 2 according to a Bluetooth (registered trademark) standard. The first communication interface 13 includes an antenna that transmits and receives Bluetooth (registered trademark) signals, and an interface circuit that processes signals transmitted through the antenna. The first communication interface 13 is an interface board including an antenna and an interface circuit, and is coupled to a main board on which the first processor 11A of the first control unit 11 and the like are mounted. Alternatively, the antenna and the interface circuit constituting the first communication interface 13 are mounted on a main board of the first control unit 11. The first communication interface 13 receives a second communication condition from the colorimeter 2 and transmits various types of instruction information to the colorimeter 2.

The first communication interface 13 corresponds to an example of a "first communication unit".

The second communication condition will be further described with reference to FIG. 3.

As illustrated in FIG. 1, the colorimeter 2 includes a second control unit 21, an operation mechanism 22, a display mechanism 23, a colorimetric mechanism 24, a second communication interface 25, and a second battery 26. The second battery 26 supplies power to each unit of the colorimeter 2. The second control unit 21 controls each unit of the colorimeter 2. Each of the operation mechanism 22, the display mechanism 23, the colorimetric mechanism 24, and the second communication interface 25 is communicatively coupled to the second control unit 21.

The second control unit 21 includes a second processor 21A such as a CPU, and a second memory 21B such as a ROM. The second memory 21B stores a second control program PG2.

The second processor 21A may be configured of a plurality of processors or may be configured of a single processor.

The second processor 21A may be hardware programmed to realize functions of each unit to be described below. That is, the second processor 21A may be configured to include the second control program PG2 installed as a hardware circuit. In this case, for example, the second processor 21A is configured as an ASIC, an FPGA, or the like.

In the following description, a case where the second processor 21A executes the second control program PG2 to realize various functions of the second control unit 21 will be described.

The second memory 21B has a storage area for storing a program that is executed by the second processor 21A and data that is processed by the second processor 21A. The second memory 21B stores, for example, the second control program PG2 that is executed by the second processor 21A, and various types of image data and setting data related to an operation of the colorimeter 2.

The second memory 21B has a non-volatile storage area for non-volatilely storing programs and data. The second memory 21B may include, for example, a ROM, a HDD, an SSD as the non-volatile storage area. Further, the second memory 21B may include a volatile storage area and constitute a work area for temporarily storing programs that are executed by the second processor 21A and processing target data. The second memory 21B may include, for example, a RAM as a volatile storage area.

The operation mechanism 22 includes various keys, light emitting diodes (LEDs), and the like, and receives an operation from the user and outputs an operation signal corresponding to the received operation to the second control unit 21.

The display mechanism 23 includes a display panel such as an LCD and displays various images on the display panel according to an instruction from the second control unit 21.

The colorimetric mechanism 24 measures colors of an image formed at a print medium according to an instruction from the second control unit 21, and outputs colorimetric results to the second control unit 21. The colorimetric mechanism 24 includes a plurality of colorimetric elements. The colorimetric element includes a light source that emits detection light, and a sensor that receives reflected light. The colorimetric element irradiates the image formed at the print medium with the detection light, receives reflection light reflected by the image using a sensor, and executes colorimetry. The colorimetric element may include an optical element that separates, reflects, guides, or disperses light incident on the sensor. The colorimetric element may be a colorimeter that measures tristimulus values, or may be a spectrophotometer. The colorimetric mechanism 24 outputs a colorimetric result of each of the plurality of colorimetric elements to the second control unit 21.

The second communication interface 25 is a communication interface that executes wireless communication with the smartphone 1 according to the Bluetooth (registered trademark) standard. The second communication interface 25 includes an antenna that transmits and receives Bluetooth (registered trademark) signals, and an interface circuit that processes signals transmitted through the antenna. The second communication interface 25 is an interface board including an antenna and an interface circuit, and is coupled to a main board on which the second processor 21A of the second control unit 21 and the like are mounted. Alternatively, the antenna and the interface circuit constituting the second communication interface 25 are mounted on a main board of the second control unit 21. The second communication interface 25 receives various types of instruction information from the smartphone 1 and transmits a second communication condition and the like to the smartphone 1.

The second communication interface 25 corresponds to an example of a "second communication unit".

Figure 2:
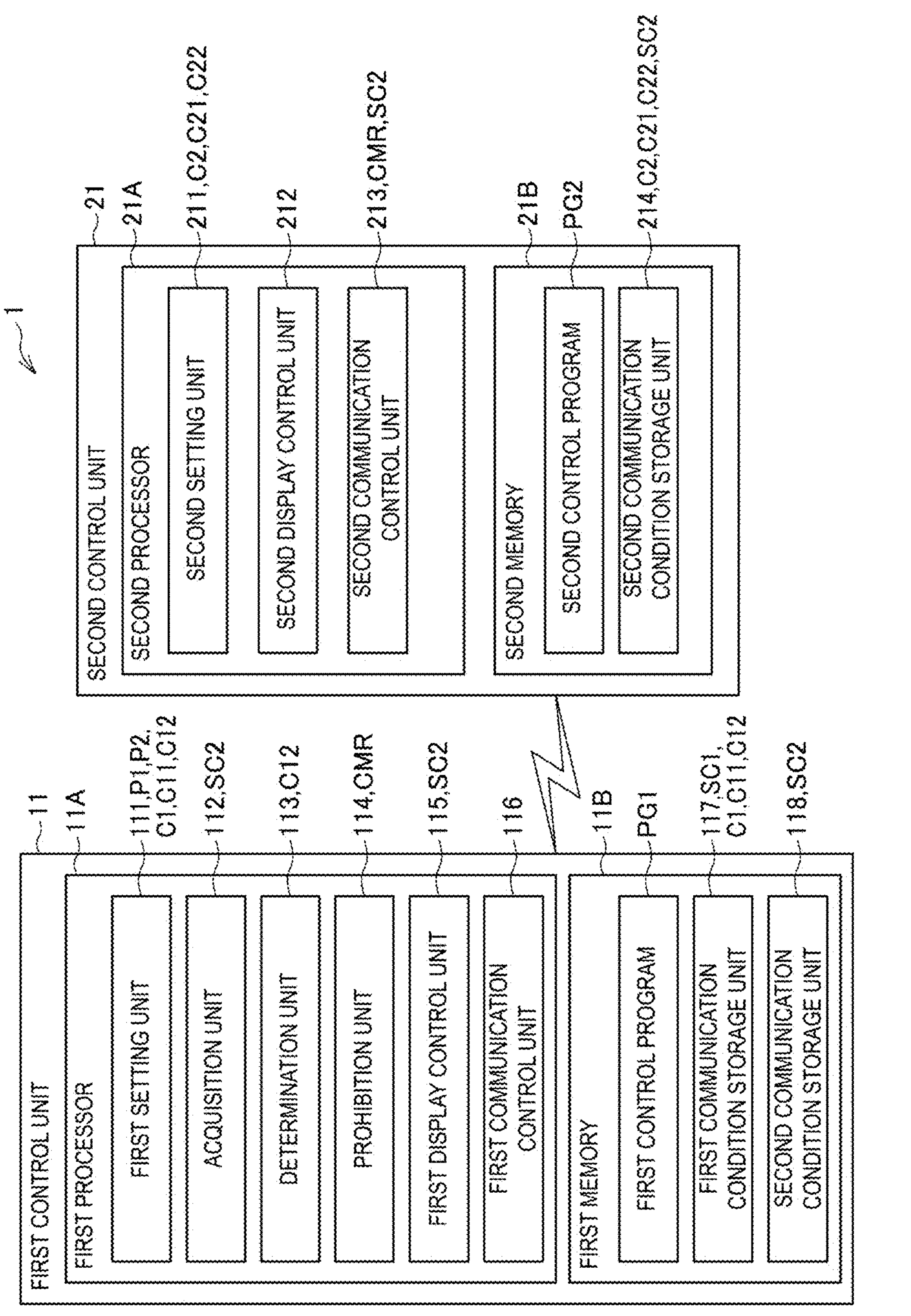
FIG. 2 is a diagram illustrating an example of a configuration of a first control unit and a second control unit.

Next, a configuration of the first control unit 11 and the second control unit 21 will be described with reference to FIG. 2. FIG. 2 is a diagram illustrating an example of the configuration of the first control unit 11 and the second control unit 21.

The first control unit 11 according to the present embodiment includes a first control unit 11 according to the first embodiment and a first control unit 11 according to the second embodiment. Hereinafter, a configuration common to the first control unit 11 according to the first embodiment and the first control unit 11 according to the second embodiment will first be described, and then a configuration different between the first control unit 11 according to the first embodiment and the first control unit 11 according to the second embodiment will be described.

As illustrated in FIG. 2, the first control unit 11 functionally includes a first setting unit 111, an acquisition unit 112, a determination unit 113, a prohibition unit 114, a first display control unit 115, a first communication control unit 116, a first communication condition storage unit 117, and a second communication condition storage unit 118.

Specifically, the first processor 11A reads the first control program PG1 from the first memory 11B and executes the first control program PG1, thereby functioning as the first setting unit 111, the acquisition unit 112, the determination unit 113, the prohibition unit 114, the first display control unit 115, and the first communication control unit 116. Further, the first processor 11A reads the first control program PG1 from the first memory 11B and executes the first control program PG1, thereby causing the first memory 11B to function as the first communication condition storage unit 117 and the second communication condition storage unit 118.

The first control program PG1 corresponds to an example of a "program".

The first communication condition storage unit 117 stores a first communication condition C1 in advance. The first communication condition C1 is a condition of transition of the first communication interface 13 of the smartphone 1 from an active state in which the first communication interface 13 communicates with the colorimeter 2 to a dormant state in which the first communication interface 13 does not communicate with the colorimeter 2. Further, the first communication condition C1 is a condition related to a state of the smartphone 1. The first communication condition C1 includes a first setting condition C11 and a second setting condition C12. The second setting condition C12 is a condition under which it is more difficult for the first communication interface 13 to transition from the active state to the dormant state than with the first setting condition C11.

Further, the first communication condition storage unit 117 stores first setting information SC1 indicating which of the first setting condition C11 and the second setting condition C12 is set. The first setting information SC1 is set by the first setting unit 111 and stored in the first communication condition storage unit 117 by the first setting unit 111.

The second communication condition storage unit 118 stores the second communication condition C2. The second communication condition C2 is a condition of transition of the second communication interface 25 of the colorimeter 2 from an active state in which the second communication interface 25 communicates with the smartphone 1 to a dormant state in which the second communication interface 25 does not communicate with the smartphone 1. The second communication condition C2 is also a condition related to a state of the colorimeter 2.

The second communication condition C2 includes a third setting condition C21 and a fourth setting condition C22. The fourth setting condition C22 is a condition under which it is more difficult for the second communication interface 25 to transition from the active state to the dormant state than with the third setting condition C21.

The second communication condition storage unit 118 stores, for example, second setting information SC2 indicating which of the third setting condition C21 and the fourth setting condition C22 is set as the second communication condition C2. The second setting information SC2 is acquired from the colorimeter 2 by the acquisition unit 112 and stored in the second communication condition storage unit 118 by the acquisition unit 112.

The second communication condition storage unit 118 corresponds to an example of a "storage unit".

The third setting condition C21 corresponds to an example of a "first setting condition".

The fourth setting condition C22 corresponds to an example of a "second setting condition".

The first setting unit 111 sets the first communication condition C1, which the condition of transition of the first communication interface 13 from the active state in which the first communication interface 13 communicates with the colorimeter 2 to the dormant state in which the first communication interface 13 does not communicate with the colorimeter 2, to any one of the first setting condition C11 and the second setting condition C12, in response to an operation from the user. For example, the first setting unit 111 sets the first communication condition C1 in response to the user operation with respect to the application setting screen 300 displayed on the touch panel 12.

The application setting screen 300 will be further described with reference to FIG. 3.

The first communication condition C1 includes the first setting condition C11 and the second setting condition C12. The second setting condition C12 is a condition under which it is more difficult for the first communication interface 13 to transition from the active state to the dormant state than with the first setting condition C11. The first communication condition C1 indicates, for example, a condition under which the smartphone 1 enters a sleep state. The sleep state corresponds to an example of a "dormant state".

Further, in the sleep state, power supply to the touch panel 12 and the first communication interface 13 is stopped or reduced in order to reduce power consumption of the smartphone 1. As a result, in the sleep state, the communication between the smartphone 1 and the colorimeter 2 is stopped.

The first setting condition C11 indicates, for example, that the smartphone 1 transitions to the sleep state when the touch panel 12 does not continuously receive a user operation during a predetermined time or more. The predetermined time is, for example, 10 minutes.

The second setting condition C12 indicates, for example, that the smartphone 1 does not transition to the sleep state even when the touch panel 12 does not continuously receive the user operation during a predetermined time or more. When the first setting condition C11 is the second setting condition C12, the predetermined time may be described as, for example, "infinity" in the following description.

That is, in the present embodiment, since the predetermined time in the second setting condition C12 is longer than the predetermined time in the first setting condition C11, the second setting condition C12 is a condition under which it is more difficult for the first communication interface 13 to transition from the active state to the dormant state than with the first setting condition C11.

The present disclosure is not limited to this example, and the predetermined time in the first setting condition C11 may be 10 minutes and the predetermined time in the second setting condition C12 may be 30 minutes. Further, the predetermined time in the first setting condition C11 may be 30 minutes, and the predetermined time in the second setting condition C12 may be "infinity". That is, the predetermined time in the second setting condition C12 may be longer than the predetermined time in the first setting condition C11.

Further, in the smartphone 1, processing of switching between the active state and the sleep state is executed by an operating system (OS) (not shown).

The first setting unit 111 stores first setting information SC1 as the first communication condition C1 in the first communication condition storage unit 117. The first setting information SC1 is information indicating which of the first setting condition C11 and the second setting condition C12 is set.

The acquisition unit 112 acquires from the colorimeter 2 the second communication condition C2, which is a condition of transition from the active state in which the colorimeter 2 communicates with the first communication interface 13 to the dormant state in which the colorimeter 2 does not communicate with the first communication interface 13. The second communication condition C2 includes the third setting condition C21 and the fourth setting condition C22.

The acquisition unit 112 acquires, for example, second setting information SC2 as the second communication condition C2. The second setting information SC2 indicates which of the third setting condition C21 and the fourth setting condition C22 is set in the colorimeter 2.

The acquisition unit 112 stores the second setting information SC2 acquired from the colorimeter 2 as the second communication condition C2 in the second communication condition storage unit 118.

The second setting information SC2 corresponds to an example of "information indicating the second communication condition".

In the first control unit 11 according to the first embodiment, for example, when communication between the first communication interface 13 and the colorimeter 2 is established, the acquisition unit 112 acquires the second setting information SC2 from the colorimeter 2. The processing of the first control unit 11 according to the first embodiment will be described with reference to FIG. 6.

In the first control unit 11 according to the second embodiment, for example, when the determination unit 113 determines that the second setting condition C12 is set as the first communication condition C1, the acquisition unit 112 acquires the second setting information SC2 from the colorimeter 2. The processing of the first control unit 11 according to the second embodiment will be described with reference to FIG. 7.

The determination unit 113 determines whether or not the second setting condition C12 is set as the first communication condition C1.

The determination unit 113 also determines whether or not the third setting condition C21 is set as the second communication condition C2 based on the second setting information SC2 acquired by the acquisition unit 112.

In the first control unit 11 according to the first embodiment, for example, when the acquisition unit 112 acquires the second communication condition C2 and the prohibition unit 114 prohibits the second communication condition C2 from being changed through the operation with respect to the operation mechanism 22 included in the colorimeter 2, the determination unit 113 determines whether or not the second setting condition C12 is set as the first communication condition C1. The processing of the first control unit 11 according to the first embodiment will be described with reference to FIG. 6.

In the first control unit 11 according to the second embodiment, for example, when the first communication interface 13 has established communication with the colorimeter 2, the determination unit 113 determines whether or not the second setting condition C12 is set as the first communication condition C1. The processing of the first control unit 11 according to the second embodiment will be described with reference to FIG. 7.

The prohibition unit 114 prohibits the colorimeter 2 from changing the second communication condition C2 through the operation with respect to the operation mechanism 22. The prohibition unit 114 instructs the colorimeter 2 to prohibit, for example, changing the second communication condition C2 through an operation with respect to the operation mechanism 22. The prohibition unit 114 transmits, for example, to the colorimeter 2 a prohibition command CMR indicating that changing the second communication condition C2 through an operation with respect to the operation mechanism 22 included in the colorimeter 2 is prohibited. When the second control unit 21 of the colorimeter 2 receives the prohibition command CMR from the smartphone 1, the second control unit 21 does not receive change in the second communication condition C2 through the operation with respect to the operation mechanism 22.

Since operations related to changing the setting of the colorimeter 2 can be consolidated in the smartphone 1 by providing such a prohibition unit 114, the smartphone 1 can centrally manage the setting of the colorimeter 2. The prohibition unit 114 is not an essential component and may be omitted appropriately.

In the first control unit 11 according to the first embodiment, for example, when the acquisition unit 112 acquires the second communication condition C2, the prohibition unit 114 instructs the colorimeter 2 to prohibit an operation for changing the second communication condition C2 in the colorimeter 2. The processing of the first control unit 11 according to the first embodiment will be described with reference to FIG. 6.

In the first control unit 11 according to the second embodiment, for example, when an operation for changing the second communication condition C2 of the colorimeter 2 from the third setting condition C21 to the fourth setting condition C22 with respect to the colorimeter setting screen 400 is received from the user, the prohibition unit 114 instructs the colorimeter 2 to prohibit the operation for changing the second communication condition C2 in the colorimeter 2. The processing of the first control unit 11 according to the second embodiment will be described with reference to FIG. 7.

The first display control unit 115 controls the image displayed on the touch panel 12.

Figure 3:
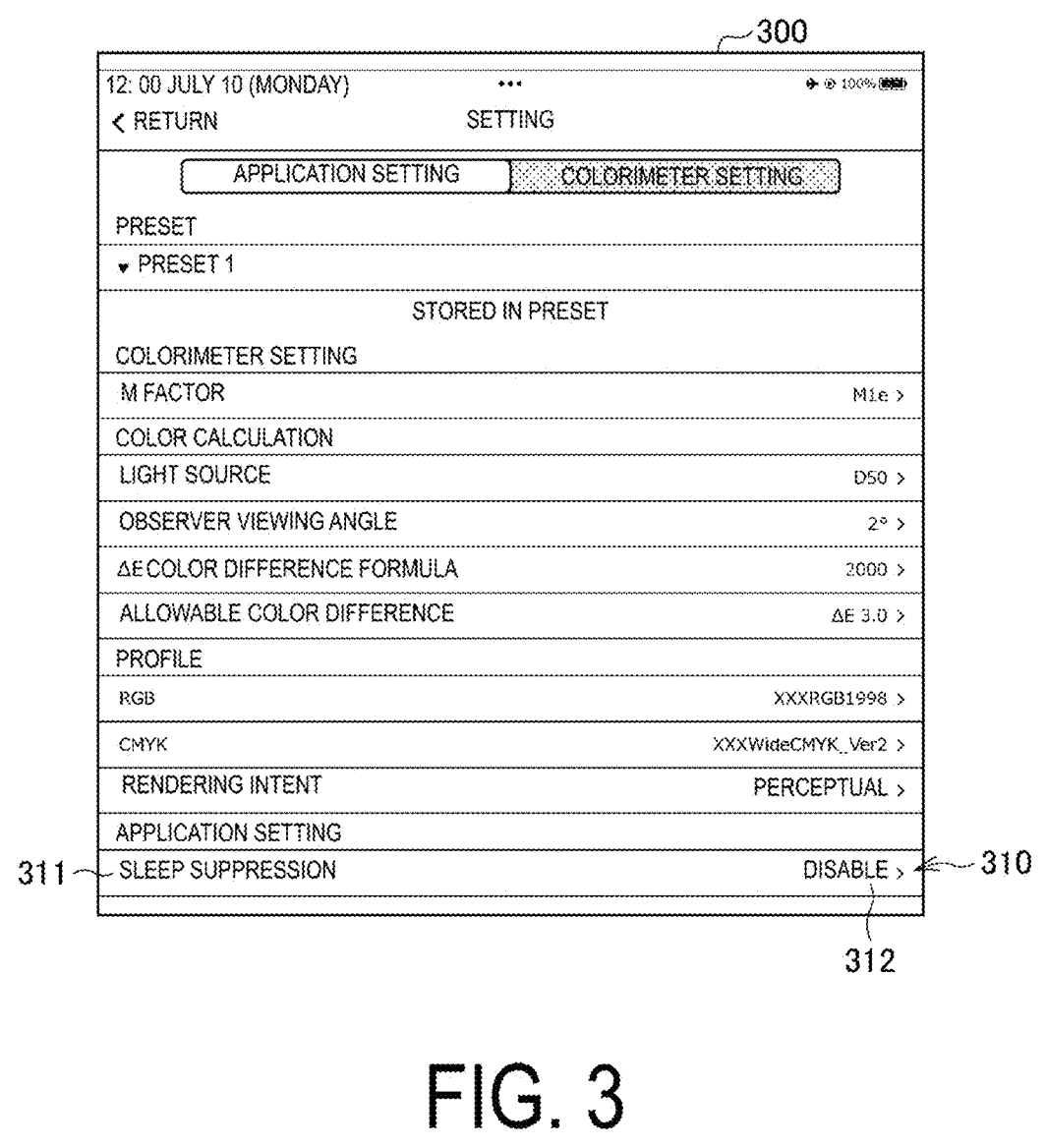
Figure 4:
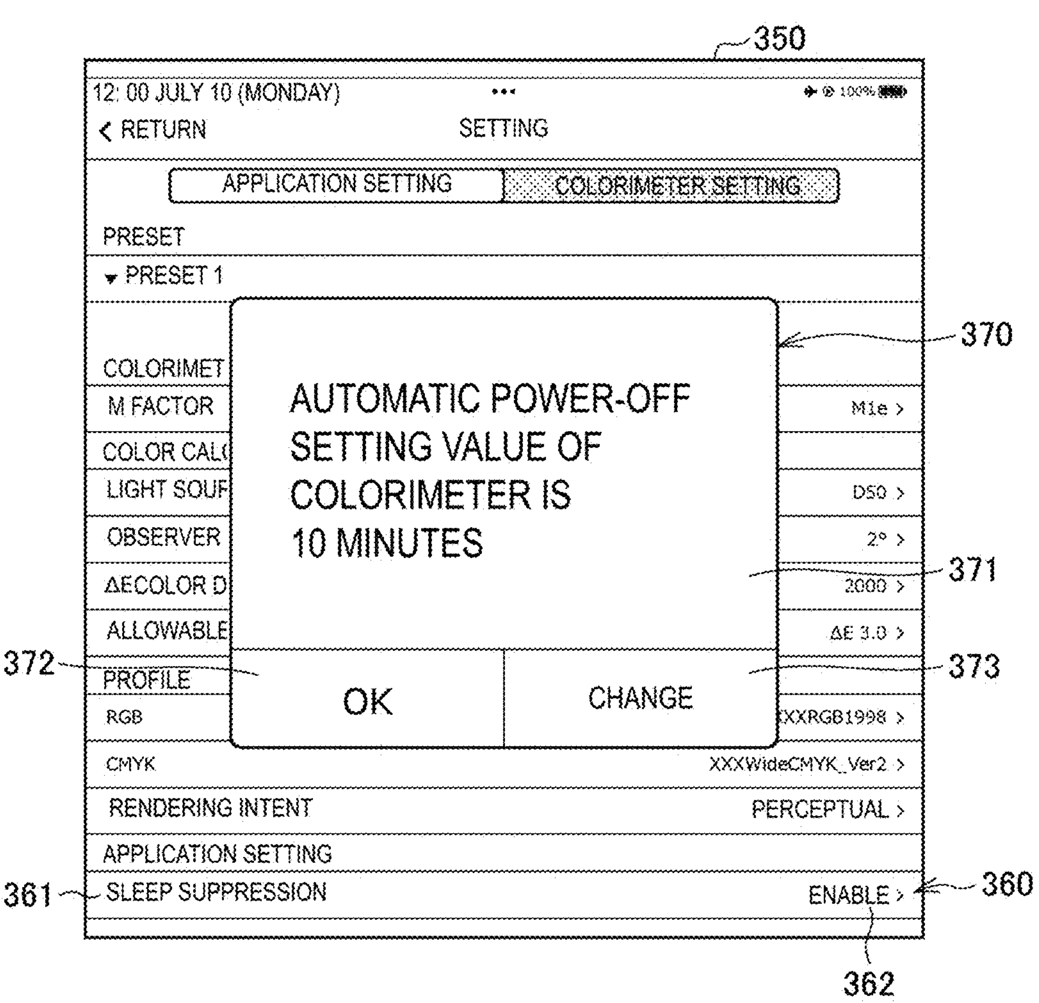
FIG. 4 is a screen diagram illustrating another example of the application setting screen displayed by the touch panel.

The first display control unit 115 displays, for example, the application setting screen 300 illustrated in FIG. 3 and the colorimeter setting screen 400 illustrated in FIG. 4 on the LCD of the touch panel 12.

When the first setting unit 111 receives a first change operation P1, which is an operation for changing the setting of the first communication condition C1 so that it is difficult for the first communication interface 13 transitions from the active state to the dormant state, the first display control unit 115 causes the touch panel 12 to display the second setting information SC2. The second setting information SC2 is information indicating the second communication condition C2. The first change operation P1 is, for example, an operation for changing the first communication condition C1 from the first setting condition C11 to the second setting condition C12.

The first change operation P1 is an operation with respect to the application setting screen 300 illustrated in FIG. 3.

When the first setting unit 111 receives a second change operation P2 which is an operation for changing the setting of the first communication condition C1 so that the first communication interface 13 can easily transition from the active state to the dormant state, the first display control unit 115 does not cause the second setting information SC2 to be displayed on the touch panel 12.

The second change operation P2 is, for example, an operation for changing the first communication condition C1 from the second setting condition C12 to the first setting condition C11.

The second change operation P2 is an operation with respect to the application setting screen 300 illustrated in FIG. 3.

When the first setting unit 111 receives the first change operation P1 and the second communication condition C2 is the third setting condition C21, the first display control unit 115 causes the second setting information SC2 to be displayed on the touch panel 12.

Further, when the first setting unit 111 receives the first change operation P1 and the second communication condition C2 is the fourth setting condition C22, the first display control unit 115 does not cause the second setting information SC2 to be displayed on the touch panel 12.

The first communication control unit 116 controls an operation of the first communication interface 13.

The first communication control unit 116 causes the first communication interface 13 to establish communication with the colorimeter 2, for example, when the first communication interface 13 transitions from the dormant state to the active state. "When the first communication interface 13 transitions from the dormant state to the active state" is, for example, when the smartphone 1 returns from the sleep state to the active state.

Further, "when the first communication interface 13 transitions from the dormant state to the active state" is, for example, when the user starts application software for controlling the colorimeter 2 on the smartphone 1. In other words, for example, "when the first communication interface 13 transitions from the dormant state to the active state" is when an icon corresponding to the application software for controlling the colorimeter 2 is touched on a home screen displayed on the touch panel 12 of the smartphone 1. The application software for controlling the colorimeter 2 corresponds to the first control program PG1 in the present embodiment.

As illustrated in FIG. 2, the second control unit 21 functionally includes a second setting unit 211, a second display control unit 212, a second communication control unit 213, and a second communication condition storage unit 214.

Specifically, the second processor 21A reads the second control program PG2 from the second memory 21B and executes the second control program PG2, thereby functioning as the second setting unit 211, the second display control unit 212, and the second communication control unit 213. Further, the second processor 21A reads the second control program PG2 from the second memory 21B and executes the second control program PG2, thereby causing the second memory 21B to function as the second communication condition storage unit 214.

The second communication condition storage unit 214 stores the second communication condition C2 in advance. The second communication condition C2 is a condition of transition of the second communication interface 25 from the active state in which the second communication interface 25 communicates with the smartphone 1 to the dormant state in which the second communication interface 25 does not communicate with the smartphone 1 The second communication condition C2 includes the third setting condition C21 and the fourth setting condition C22. The fourth setting condition C22 is a condition under which it is more difficult for the second communication interface 25 to transition from the active state to the dormant state than with the third setting condition C21. The second communication condition storage unit 214 also stores the second setting information SC2 indicating which of the third setting condition C21 and the fourth setting condition C22 has been set. The second setting information SC2 is set by the second setting unit 211 and stored in the second communication condition storage unit 214 by the second setting unit 211.

The second setting unit 211 sets the second communication condition C2, which is the condition of transition of the second communication interface 25 of the colorimeter 2 from the active state in which the second communication interface 25 communicates with the smartphone 1 to the dormant state in which the second communication interface 25 does not communicate with the smartphone 1, in response to an operation from the user.

For example, the second setting unit 211 sets the second communication condition C2 in response to a user operation with respect to the colorimeter setting screen 400 displayed on the touch panel 12 of the smartphone 1. In this case, a command for instructing the colorimeter 2 to set the second communication condition C2 is transmitted from the smartphone 1 to the colorimeter 2. The second setting unit 211 sets the second communication condition C2 in response to the command transmitted from the smartphone 1.

The colorimeter setting screen 400 will be further described with reference to FIG. 4.

Further, for example, the second setting unit 211 sets the second communication condition C2 in response to a user operation with respect to the operation mechanism 22.

However, when the prohibition command CMR is received from the smartphone 1, the second setting unit 211 prohibits the second communication condition C2 from being changed through the user operation with respect to the operation mechanism 22. The prohibition command CMR indicates that the second communication condition C2 is prohibited from being changed through the operation with respect to the operation mechanism 22 included in the colorimeter 2.

The second communication condition C2 includes the third setting condition C21 and the fourth setting condition C22. The fourth setting condition C22 is a condition under which it is more difficult for the second communication interface 25 to transition from the active state to the dormant state than with the third setting condition C21. The second communication condition C2 indicates, for example, a condition under which the colorimeter 2 enters a power saving state. The “power saving state” indicates a state in which power supplied from the second battery 26 to each unit of the colorimeter 2 is stopped or reduced. In the power saving state, since the power supplied from the second battery 26 to the second communication interface 25 is stopped or reduced, the second communication interface 25 enters the dormant state.

The third setting condition C21 indicates, for example, that the colorimeter 2 transitions to the power saving state when the operation mechanism 22 does not continuously receive an operation during a predetermined time or more. The predetermined time is, for example, 10 minutes.

The fourth setting condition C22 indicates, for example, that the colorimeter 2 does not transition to the power saving state even when the operation mechanism 22 does not continuously receive an operation during a predetermined time or more. In this case, the predetermined time may be described as, for example, “infinity”.

That is, in the present embodiment, since the predetermined time in the fourth setting condition C22 is longer than the predetermined time in the third setting condition C21, the fourth setting condition C22 is a condition under which it is more difficult for the second communication interface 25 to transition from the active state to the dormant state than with the third setting condition C21.

The present disclosure is not limited to this example, and the predetermined time in the third setting condition C21 may be 10 minutes and the predetermined time in the fourth setting condition C22 may be 30 minutes. Further, the predetermined time in the third setting condition C21 may be 30 minutes, and the predetermined time in the fourth setting condition C22 may be “infinity”. That is, the predetermined time in the fourth setting condition C22 may be longer than the predetermined time in the third setting condition C21.

In the colorimeter 2, processing of switching between the active state and the dormant state is executed by an OS (not shown).

The second setting unit 211 stores the second setting information SC2 as the second communication condition C2 in the second communication condition storage unit 214. The second setting information SC2 is information indicating which of the third setting condition C21 and the fourth setting condition C22 is set.

The second display control unit 212 controls an image to be displayed on the display mechanism 23.

The second display control unit 212 displays, for example, the second setting information SC2. The second setting information SC2 is information indicating which of the third setting condition C21 and the fourth setting condition C22 is set.

The second communication control unit 213 controls the operation of the second communication interface 25.

The second communication control unit 213 causes the second communication interface 25 to establish communication with the smartphone 1, for example, when the power of the colorimeter 2 is turned on.

The second communication control unit 213 also transmits the second setting information SC2 to the smartphone 1 in response to a request from the acquisition unit 112 of the smartphone 1.

The second communication control unit 213 also receives the prohibition command CMR from the prohibition unit 114 of the smartphone 1.

Next, the application setting screen 300 that is displayed by the touch panel 12 of the smartphone 1 will be described with reference to FIG. 3. FIG. 3 is a screen diagram illustrating an example of the application setting screen 300 that is displayed by the touch panel 12. The application setting screen 300 is displayed on the touch panel 12 by the first display control unit 115.

The application setting screen 300 illustrated in FIG. 3 is a screen for a setting for application software (the first control program PG1) installed on the smartphone 1, and the operation of the smartphone 1 is specified by this setting.

The application setting screen 300 includes a sleep condition setting unit 310. The sleep condition setting unit 310 sets the first communication condition C1 in response to the operation from the user. In other words, the first setting unit 111 sets the first communication condition C1 in response to the user operation with respect to the sleep condition setting unit 310.

The sleep condition setting unit 310 includes a title display unit 311 and a condition setting unit 312.

"Sleep suppression" for example, is displayed on the title display unit 311. The "Sleep suppression" indicates that the smartphone 1 enters a state in which it is difficult for the smartphone 1 to transition to the sleep state.

In the condition setting unit 312, for example, "Disabled" is displayed to indicate that the smartphone 1 is set to a state in which it is easy for the smartphone 1 to transition to the sleep state. In this case, the first setting unit 111 sets the first communication condition C1 to the first setting condition C11. The second setting condition C12 indicates, for example, that the predetermined time is "10 minutes".

For example, as illustrated in FIG. 3, when the user touches the condition setting unit 312 in a state in which "Disabled" is displayed in the condition setting unit 312, "Enabled" is displayed in the condition setting unit 312. In this case, the first setting unit 111 sets the first communication condition C1 to the second setting condition C12. The second setting condition C12 indicates, for example, that the predetermined time is "infinity".

An operation for changing the display content of the condition setting unit 312 from "disabled" to "enabled" corresponds to an example of the first change operation P1.

The operation for changing the display content of the condition setting unit 312 from "enabled" to "disabled" corresponds to an example of the second change operation P2.

Next, an application setting screen 350 that is displayed by the touch panel 12 of the smartphone 1 will be described with reference to FIG. 4. FIG. 4 is a screen diagram illustrating another example of the application setting screen 350 that is displayed by the touch panel 12.

The application setting screen 350 illustrated in FIG. 4 is displayed on the touch panel 12 by the first display control unit 115 when the first change operation P1 is performed with respect to the application setting screen 300 illustrated in FIG. 3.

The application setting screen 350 includes a sleep condition setting unit 360. The sleep condition setting unit 360 sets the first communication condition C1 in response to an operation from the user. In other words, the first setting unit 111 sets the first communication condition C1 in response to a user operation with respect to the sleep condition setting unit 360.

The sleep condition setting unit 360 includes a title display unit 361 and a condition setting unit 362.

"Sleep suppression", for example, is displayed on the title display unit 361. The "Sleep suppression" indicates that the smartphone 1 enters a state in which it is difficult for the smartphone 1 to transition to the sleep state.

"Enabled", for example, is displayed on the condition setting unit 362. In this case, the first setting unit 111 sets the first communication condition C1 to the second setting condition C12. The second setting condition C12 indicates, for example, that the predetermined time is, for example, "infinity". In this case, even when the operation mechanism 22 does not continuously receive an operation, the smartphone 1 does not transition to the sleep state.

Further, the application setting screen 350 includes a colorimeter setting reception unit 370. The colorimeter setting reception unit 370 includes a guidance display unit 371, an OK button 372, and a change button 373.

"An automatic power-off setting value of the colorimeter is 10 minutes" is, for example, displayed on the guidance display unit 371 In this case, when the operation mechanism 22 does not continuously receive an operation from the user for 10 minutes or more, the colorimeter 2 transitions to the power saving state.

The OK button 372 is touched when the user does not want to change the setting of the colorimeter 2. When the OK button 372 is touched, the first display control unit 115, for example, stops displaying the colorimeter setting reception unit 370. That is, the first display control unit 115, for example, erases the display of the colorimeter setting reception unit 370.

The change button 373 is touched when the user changes the setting of the colorimeter 2. When the change button 373 is touched, the first display control unit 115 displays, for example, the colorimeter setting screen 400 illustrated in FIG. 5 on the touch panel 12.

Figure 5:
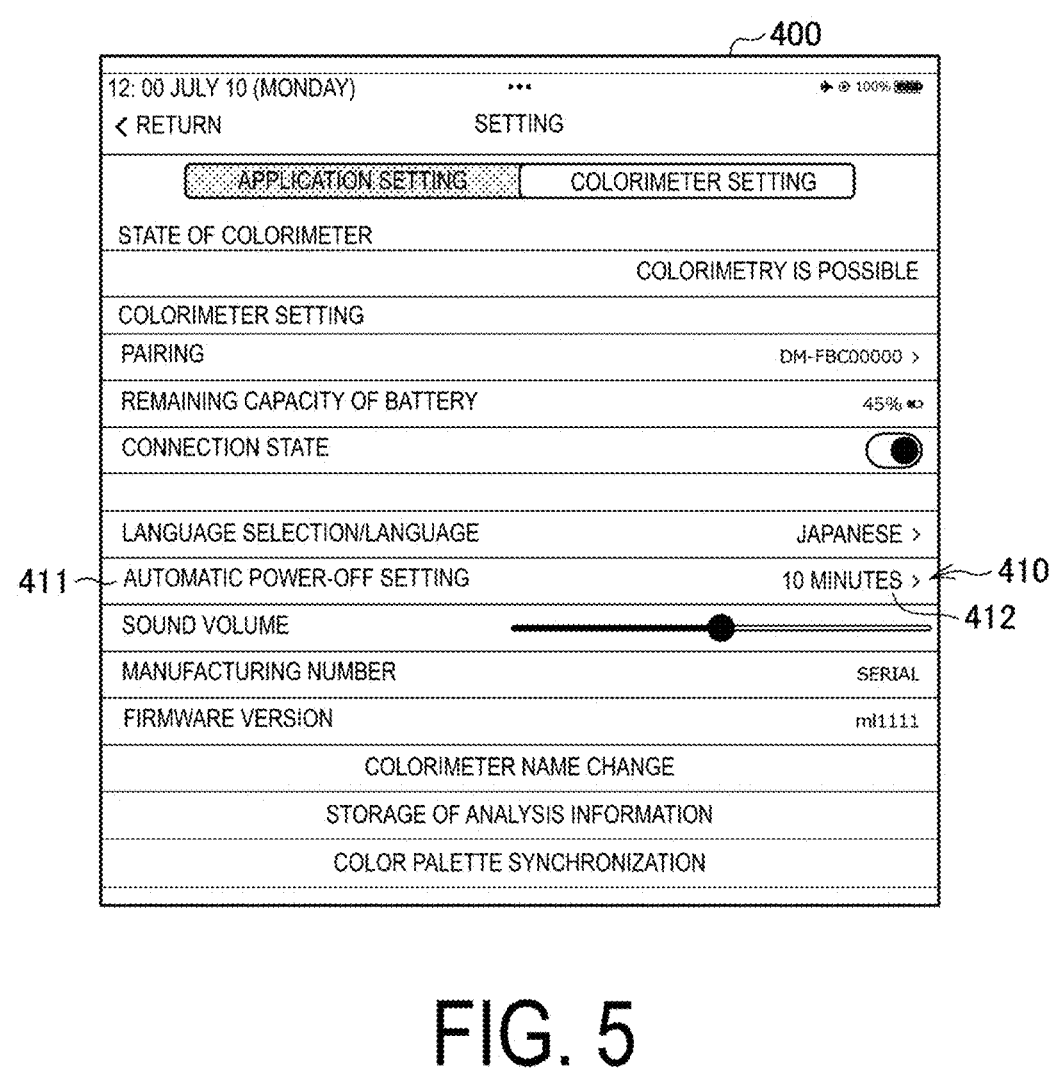

Next, the colorimeter setting screen 400 displayed on the touch panel 12 of the smartphone 1 will be described with reference to FIG. 5. FIG. 5 is a screen diagram illustrating an example of the colorimeter setting screen 400 displayed on the touch panel 12. The colorimeter setting screen 400 is displayed on the touch panel 12 by the first display control unit 115, for example, when the change button 373 illustrated in FIG. 4 is touched.

The colorimeter setting screen 400 in FIG. 5 is a screen for remotely setting the colorimeter 2 through application software (the first control program PG1) installed on the smartphone 1.

The colorimeter setting screen 400 includes a power-off setting unit 410. The power-off setting unit 410 sets the second communication condition C2 in response to the operation from the user. In other words, the second setting unit 211 sets the second communication condition C2 in response to the user operation with respect to the power-off setting unit 410.

The power-off setting unit 410 includes a title display unit 411 and a condition setting unit 412.

On the title display unit 411, for example, "Automatic power-off setting", is displayed to indicate that a condition under which the colorimeter 2 is powered off is set.

"10 minutes", for example, is displayed in the condition setting unit 412. In this case, when the operation mechanism 22 does not continuously receive an operation from the user for 10 minutes or more, the colorimeter 2 transitions to the power saving state. In this case, the second setting unit 211 sets the second communication condition C2 to the third setting condition C21.

Figure 6:
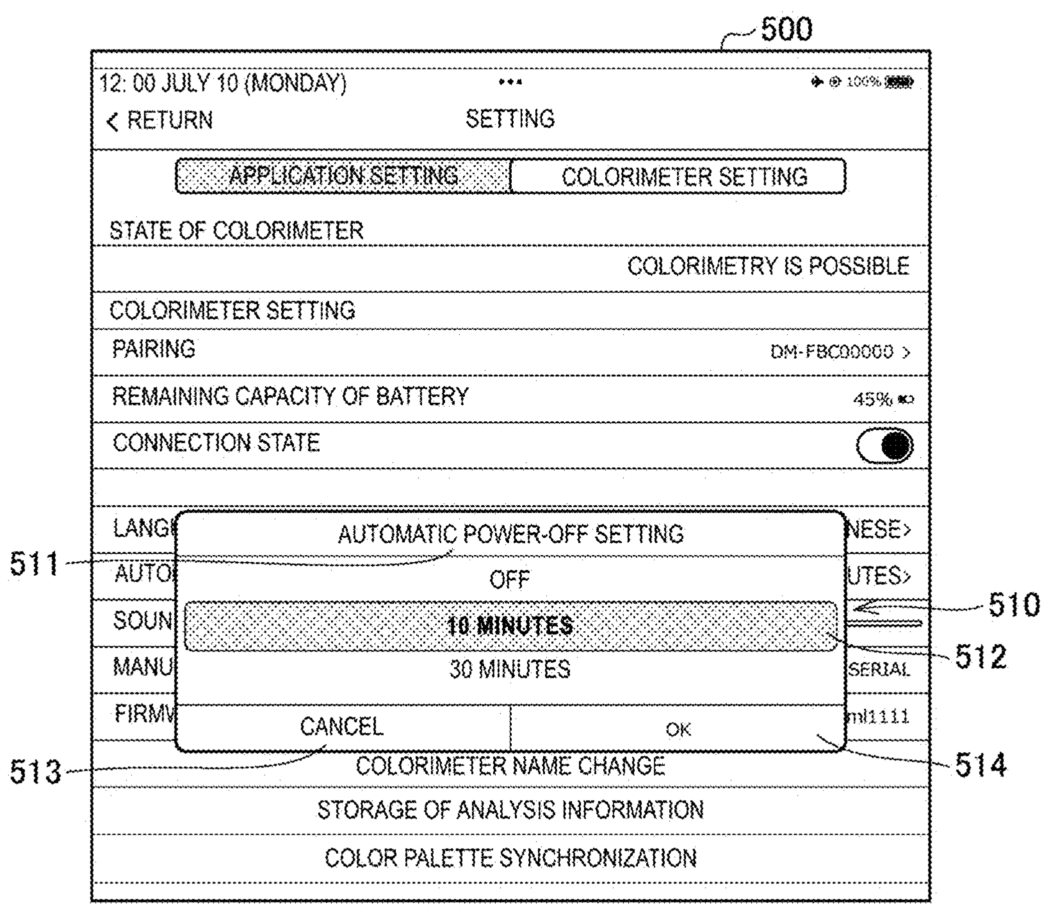
FIG. 6 is a screen diagram illustrating another example of the colorimeter setting screen displayed by the touch panel.

For example, when the user touches the condition setting unit 412, the colorimeter setting screen 500 illustrated in FIG. 6 is displayed. In other words, when the user touches the condition setting unit 412, the first display control unit 115 displays the colorimeter setting screen 500 on the touch panel 12.

Further, when the first setting unit 111 receives the first change operation P1 and the second communication condition C2 is the third setting condition C21, the first display control unit 115 displays the colorimeter setting screen 500 on the touch panel 12.

Next, the colorimeter setting screen 500 displayed on the touch panel 12 of the smartphone 1 will be described with reference to FIG. 6. FIG. 6 is a screen diagram illustrating another example of the colorimeter setting screen 500 displayed on the touch panel 12. The colorimeter setting screen 500 is displayed on the touch panel 12 by the first display control unit 115.

The colorimeter setting screen 500 includes a power-off setting unit 510. The power-off setting unit 510 sets the second communication condition C2 in response to an operation from the user. In other words, the second setting unit 211 sets the second communication condition C2 in response to the user operation with respect to the power-off setting unit 510.

The colorimeter setting screen 500 is a screen in which the power-off setting unit 510 is displayed as a pop-up with the colorimeter setting screen 400 as the background image.

The power-off setting unit 510 includes a title display unit 511, a condition setting unit 512, a cancel button 513, and an OK button 514.

On the title display unit 511, for example, "Automatic power-off setting", is displayed to indicate that a condition under which the colorimeter 2 is powered off is set.

On the condition setting unit 412, for example, "Off", "10 minutes", and "30 minutes" are displayed to be selectable.

When the user selects "Off" and touches the OK button 514, the second communication condition C2 is changed from the third setting condition C21 to the fourth setting condition C22. When the user selects "Off" and touches the OK button 514, for example, the first display control unit 115 transmits to the colorimeter 2 a command for instructing the colorimeter 2 to change the second communication condition C2 from the third setting condition C21 to the fourth setting condition C22. When the second setting unit 211 of the colorimeter 2 receives this command, the second setting unit 211 of the colorimeter 2 changes the second communication condition C2 from the third setting condition C21 to the fourth setting condition C22.

Further, when the user selects "30 minutes" and touches the OK button 514, the colorimeter 2 transitions to the power saving state when the operation mechanism 22 does not continuously receive the user operation for 30 minutes or more. In this case, the second communication condition C2 is maintained as the third setting condition C21. However, the condition of transition to the power saving state is changed from the operation mechanism 22 not continuously receiving a user operation for 10 minutes or more to the operation mechanism 22 not continuously receiving a user operation for 30 minutes or more. Therefore, it becomes more difficult for the colorimeter 2 to transition to the power saving state compared to the state illustrated in FIG. 5.

Figure 7:
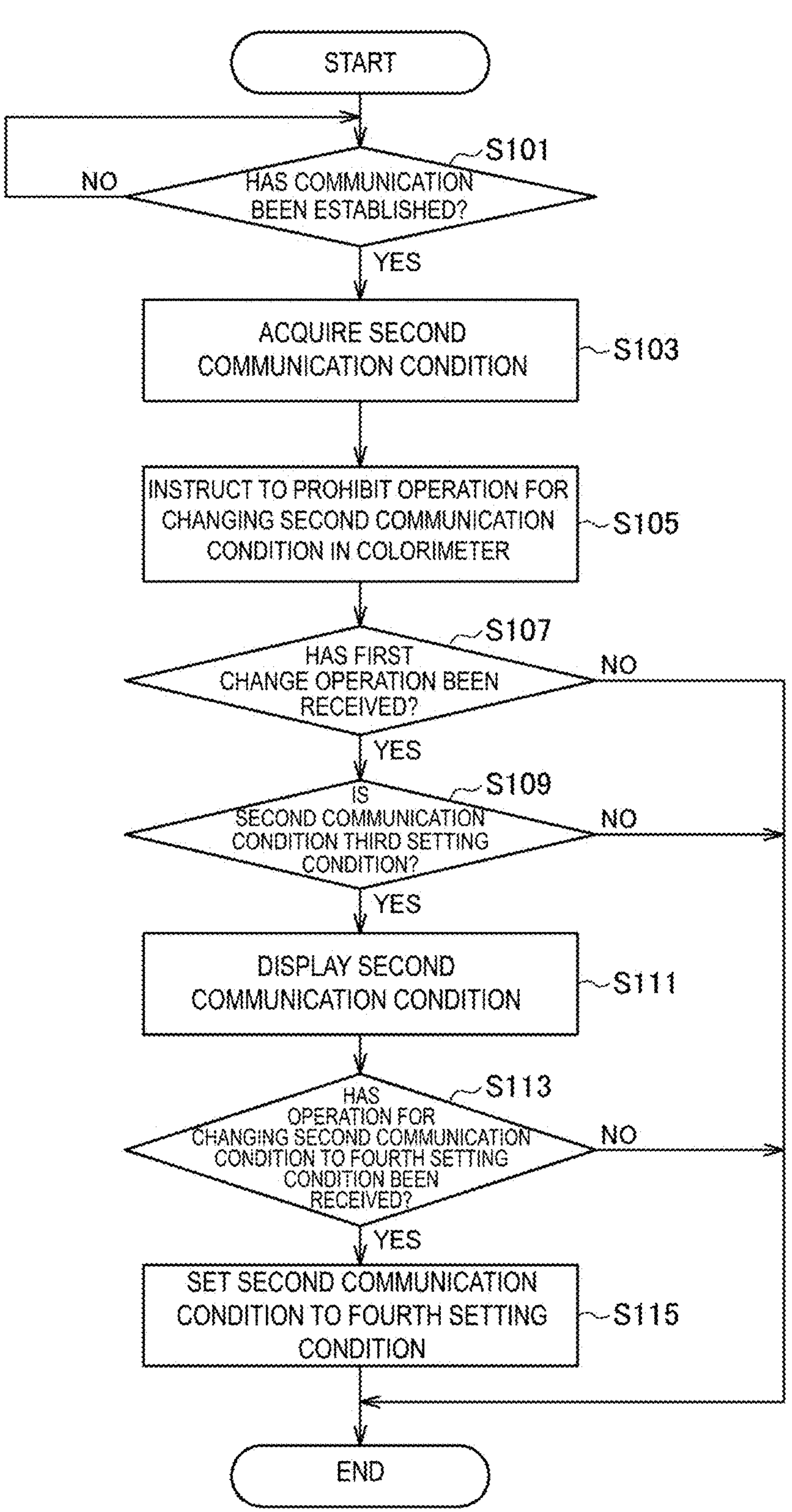
FIG. 7 is a flowchart showing an example of processing by the first control unit according to a first embodiment.

Next, the processing of the first control unit 11 according to the first embodiment will be described with reference to FIG. 7. FIG. 7 is a flowchart showing an example of the processing of the first control unit 11 according to the first embodiment. A case where the first setting condition C11 is set as the first communication condition C1 in the smartphone 1 in an initial state will be described in FIG. 7.

As illustrated in FIG. 7, first, in step S101, the first communication control unit 116 determines whether or not the first communication interface 13 has established communication with the second communication interface 25 of the colorimeter 2.

When the first communication control unit 116 determines that the communication with the second communication interface 25 of the colorimeter 2 has not been established (step S101; NO), the processing enters a standby state. When the first communication control unit 116 determines that the communication with the second communication interface 25 of the colorimeter 2 has been established (step S101; YES), the processing proceeds to step S103.

In step S103, the acquisition unit 112 acquires the second communication condition C2 from the colorimeter 2. The acquisition unit 112 acquires, for example, the second setting information SC2 as the second communication condition C2. The second setting information SC2 indicates which of the first setting condition C11 and the second setting condition C12 is set in the colorimeter 2.

Next, in step S105, the prohibition unit 114 prohibits the colorimeter 2 from changing the second communication condition C2 through the operation with respect to the operation mechanism 22 included in the colorimeter 2. The prohibition unit 114 transmits, for example, to the colorimeter 2 the prohibition command CMR indicating that changing the second communication condition C2 through an operation with respect to the operation mechanism 22 included in the colorimeter 2 is prohibited.

Next, in step S107, the first setting unit 111 determines whether or not the first change operation P1 has been received. The first change operation P1 is an operation for changing the first communication condition C1 from the first setting condition C11 to the second setting condition C12. More specifically, the first change operation P1 is, for example, an operation in which the user touches the condition setting unit 312 illustrated in FIG. 3 to change the display content from "disabled" to "enabled".

When the first setting unit 111 determines that the first change operation P1 has not been received (step S107; NO), the determination unit 113 determines that the first setting condition C11 has been set as the first communication condition C1, and then, the processing ends. When the first setting unit 111 determines that the first change operation P1 has been received (step S107; YES), the first setting unit 111 changes the first communication condition C1 from the first setting condition C11 to the second setting condition C12. The determination unit 113 determines that the second setting condition C12 has been set as the first communication condition C1, and the processing proceeds to step S109.

In step S109, the determination unit 113 determines whether or not the third setting condition C21 has been set as the second communication condition C2, based on the second setting information SC2 acquired by the acquisition unit 112 in step S103.

When the determination unit 113 determines that the third setting condition C21 has not been set as the second communication condition C2 (step S109; NO), the processing then ends. When the determination unit 113 determines that the third setting condition C21 has been set as the second communication condition C2 (step S109; YES), the processing proceeds to step S111.

In step S111, the first display control unit 115 displays the second communication condition C2 on the touch panel 12. More specifically, the first display control unit 115 displays a message such as "An automatic power-off setting value of the colorimeter is 10 minutes" on the touch panel 12, for example, as shown in the guidance display unit 371 of FIG. 4.

Next, in step S113, the first display control unit 115 determines whether or not an operation to change the second communication condition C2 from the third setting condition C21 to the fourth setting condition C22 has been received. More specifically, the first display control unit 115 determines whether three operations below have been subsequentially received. First, the user touches the change button 373 illustrated in FIG. 4 to cause the colorimeter setting screen 400 illustrated in FIG. 5 to be displayed on the touch panel 12. Next, the user touches the condition setting unit 412 to cause the power-off setting unit 510 illustrated in FIG. 6 to be displayed. Next, the user determines whether the second communication condition C2 has been changed from the third setting condition C21 to the fourth setting condition C22 through an operation with respect to the power-off setting unit 510.

When the first display control unit 115 determines that the operation to change the second communication condition C2 from the third setting condition C21 to the fourth setting condition C22 has not been received (step S113; NO), the processing then ends. When the first display control unit 115 determines that the operation to change the second communication condition C2 from the third setting condition C21 to the fourth setting condition C22 has been received (step S113; YES), the processing proceeds to step S115.

In step S115, the first display control unit 115 transmits to the colorimeter 2 the command for instructing the colorimeter 2 to change the second communication condition C2 from the third setting condition C21 to the fourth setting condition C22. When the second setting unit 211 of the colorimeter 2 receives this command, the second setting unit 211 changes the second communication condition C2 from the third setting condition C21 to the fourth setting condition C22. The processing then ends.

Figure 8:
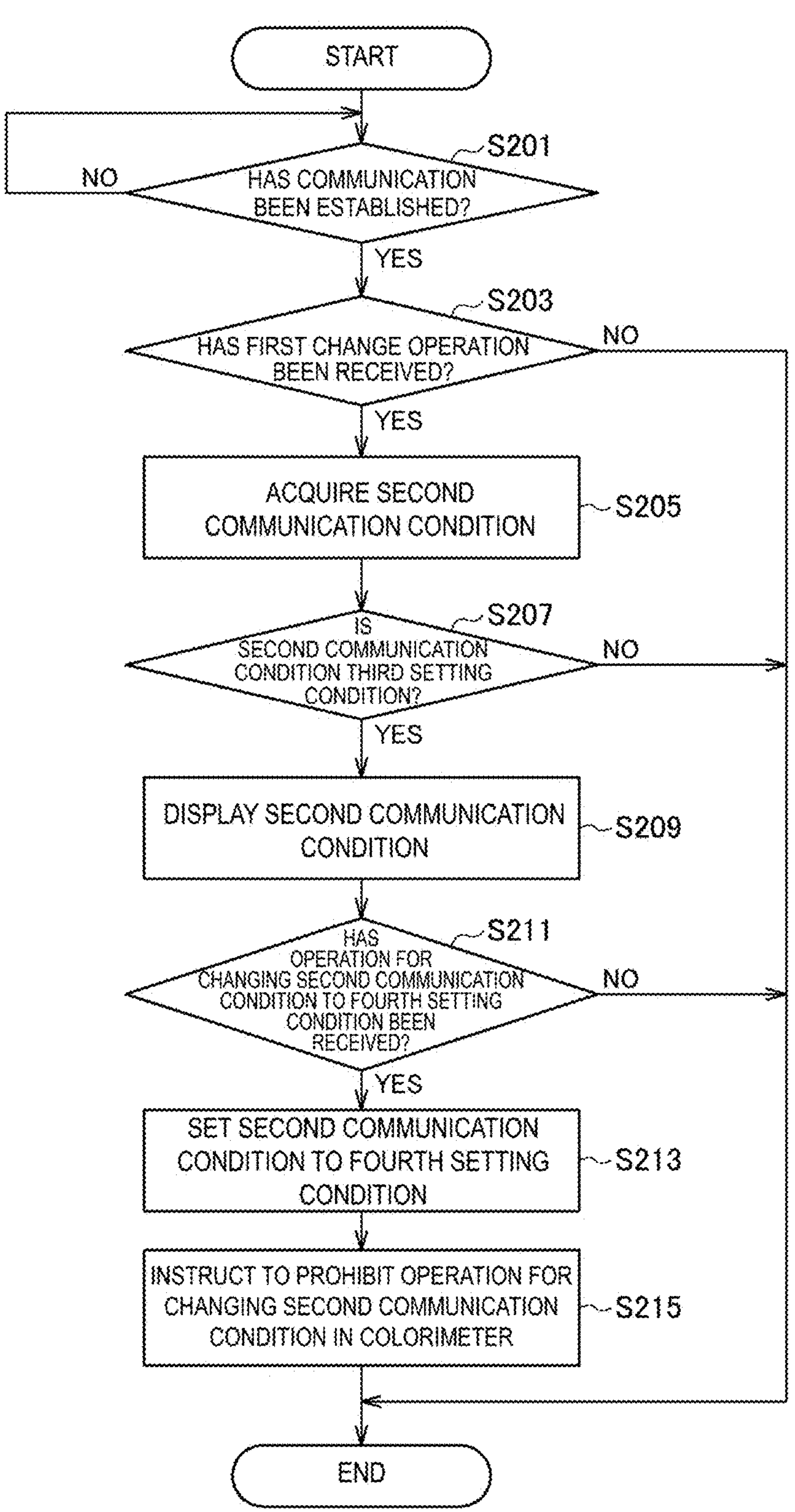
FIG. 8 is a flowchart showing an example of processing by the first control unit according to a second embodiment.

Next, the processing of the first control unit 11 according to the second embodiment will be described with reference to FIG. 8. FIG. 8 is a flowchart showing an example of the processing of the first control unit 11 according to the second embodiment. A case where the first setting condition C11 is set as the first communication condition C1 in the smartphone 1 in an initial state will be described in FIG. 8.

As illustrated in FIG. 8, first, in step S201, the first communication control unit 116 determines whether or not the first communication interface 13 has established communication with the second communication interface 25 of the colorimeter 2.

When the first communication control unit 116 determines that the communication with the second communication interface 25 of the colorimeter 2 has not been established (step S201; NO), the processing enters the standby state. When the first communication control unit 116 determines that the communication with the second communication interface 25 of the colorimeter 2 has been established (step S201; YES), the processing proceeds to step S203.

Next, in step S203, the first setting unit 111 determines whether or not the first change operation P1 has been received. The first change operation P1 is an operation for changing the first communication condition C1 from the first setting condition C11 to the second setting condition C12. More specifically, the first change operation P1 is, for example, an operation in which the user touches the condition setting unit 312 illustrated in FIG. 3 to change the display content from “disabled” to “enabled”.

When the first setting unit 111 determines that the first change operation P1 has not been received (step S203; NO), the determination unit 113 determines that the first setting condition C11 has been set as the first communication condition C1, and the processing then ends. When the first setting unit 111 determines that the first change operation P1 has been received (step S203; YES), the first setting unit 111 changes the first communication condition C1 from the first setting condition C11 to the second setting condition C12. The determination unit 113 determines that the second setting condition C12 has been set as the first communication condition C1, and the processing proceeds to step S205.

In step S205, the acquisition unit 112 acquires the second communication condition C2 from the colorimeter 2. The acquisition unit 112 acquires, for example, the second setting information SC2 as the second communication condition C2. The second setting information SC2 indicates which of the first setting condition C11 and the second setting condition C12 is set in the colorimeter 2.

Next, in step S207, the determination unit 113 determines whether or not the third setting condition C21 is set as the second communication condition C2, based on the second setting information SC2 acquired by the acquisition unit 112.

When the determination unit 113 determines that the third setting condition C21 is not set as the second communication condition C2 (step S207; NO), the processing then ends. When the determination unit 113 determines that the third setting condition C21 is set as the second communication condition C2 (step S207; YES), the processing proceeds to step S209.

In step S209, the first display control unit 115 displays the second communication condition C2 on the touch panel 12. More specifically, the first display control unit 115 displays a message such as “An automatic power-off setting value of the colorimeter is 10 minutes” on the touch panel 12, for example, as shown in the guidance display unit 371 of FIG. 4.

Next, in step S211, the first display control unit 115 determines whether or not the operation to change the second communication condition C2 from the third setting condition C21 to the fourth setting condition C22 has been received. More specifically, the first display control unit 115 determines whether or not three operations below have been sequentially received. First, the user touches the change button 373 illustrated in FIG. 4 to cause the colorimeter setting screen 400 illustrated in FIG. 5 to be displayed on the touch panel 12. Next, the user touches the condition setting unit 412 to cause the power-off setting unit 510 illustrated in FIG. 6 to be displayed. Next, the user determines whether the second communication condition C2 has been changed from the third setting condition C21 to the fourth setting condition C22 through an operation with respect to the power-off setting unit 510.

When the first display control unit 115 determines that the operation to change the second communication condition C2 from the third setting condition C21 to the fourth setting condition C22 has not been received (step S211; NO), the processing then ends. When the first display control unit 115 determines that the operation to change the second communication condition C2 from the third setting condition C21 to the fourth setting condition C22 has been received (step S211; YES), the processing proceeds to step S213.

In step S213, the first display control unit 115 transmits to the colorimeter 2 the command for instructing the colorimeter 2 to change the second communication condition C2 from the third setting condition C21 to the fourth setting condition C22. When the second setting unit 211 of the colorimeter 2 receives this command, the second setting unit 211 of the colorimeter 2 changes the second communication condition C2 from the third setting condition C21 to the fourth setting condition C22.

Next, in step S215, the prohibition unit 114 prohibits the colorimeter 2 from changing the second communication condition C2 through the operation with respect to the operation mechanism 22 included in the colorimeter 2. The prohibition unit 114 transmits, for example, to the colorimeter 2 the prohibition command CMR indicating that changing the second communication condition C2 through the operation with respect to the operation mechanism 22 included in the colorimeter 2 is prohibited. When the prohibition command CMR is received, the colorimeter 2 prohibits the second communication condition C2 from being changed through the operation with respect to the operation mechanism 22. The processing then ends.

As described with reference to FIGS. 7 and 8, the first control unit 11 according to the second embodiment differs from the first control unit 11 according to the first embodiment in the following two points. That is, a timing at which the acquisition unit 112 acquires the second communication condition C2 from the colorimeter 2 is different from a timing at which the prohibition unit 114 prohibits the second communication condition C2 from being changed through the operation with respect to the operation mechanism 22 included in the colorimeter 2.

In the first control unit 11 according to the first embodiment, the acquisition unit 112 acquires the second communication condition C2 from the colorimeter 2 when the communication between the smartphone 1 and the colorimeter 2 has been established. On the other hand, in the first control unit 11 according to the second embodiment, the acquisition unit 112 acquires the second communication condition C2 from the colorimeter 2 when the determination unit 113 determines that the second setting condition C12 is set as the first communication condition C1.

In the first control unit 11 according to the first embodiment, when the acquisition unit 112 acquires the second communication condition C2 from the colorimeter 2, the prohibition unit 114 prohibits the second communication condition C2 from being changed through the operation with respect to the operation mechanism 22 included in the colorimeter 2. On the other hand, in the first control unit 11 according to the second embodiment, when the first display control unit 115 issues an instruction to change the second communication condition C2 to the fourth setting condition C22, the prohibition unit 114 prohibits the second communication condition C2 from being changed through the operation with respect to the operation mechanism 22 included in the colorimeter 2.

As described above with reference to FIGS. 1 to 8, the smartphone 1 according to the present embodiment includes the first communication interface 13 that communicates with the colorimeter 2, the first setting unit 111 that sets the first communication condition C1 that is the condition of transition of the first communication interface 13 from the active state in which the first communication interface 13 communicates with the colorimeter 2 to the dormant state in which the first communication interface 13 does not communicate with the colorimeter 2 in response to the operation from the user, the acquisition unit 112 that acquires from the colorimeter 2 the second communication condition C2, which is a condition of transition from the active state in which the colorimeter 2 communicates with the first communication interface 13 to the dormant state in which the colorimeter 2 does not communicate with the first communication interface 13, and the first display control unit 115 that controls the touch panel 12, wherein when the first setting unit 111 receives the first change operation P1, which is an operation for changing the setting of the first communication condition C1 so that it is difficult for the first communication interface 13 transitions from the active state to the dormant state, the first display control unit 115 causes the information indicating the second communication condition C2 to be displayed on the touch panel 12.

Accordingly, when the first setting unit 111 receives the first change operation P1, the first display control unit 115 causes the information indicating the second communication condition C2 to be displayed on the touch panel 12. The first change operation P1 is the operation for changing the setting of the first communication condition C1 so that it is difficult for the first communication interface 13 transitions from the active state to the dormant state.

That is, when the user changes the setting of the first communication condition C1 to curb disconnection of the communication between the smartphone 1 and the colorimeter 2, the information indicating the second communication condition C2 is displayed on the touch panel 12. Accordingly, the user can easily confirm the second communication condition C2. This makes it possible to curb disconnection of communication between the colorimeter 2 and the smartphone 1 without a user's intention.

Further, in the smartphone 1, when the first setting unit 111 receives the second change operation P2 which is an operation for changing the setting of the first communication condition C1 so that the first communication interface 13 can easily transition from the active state to the dormant state, the first display control unit 115 does not cause the second setting information SC2 to be displayed on the touch panel 12.

Accordingly, when the first setting unit 111 receives the second change operation P2, the first display control unit 115 does not cause the information indicating the second communication condition C2 to be displayed on the touch panel 12. The second change operation P2 is an operation for changing the setting of the first communication condition C1 so that the first communication interface 13 can easily transition from the active state to the inactive state.

That is, when the user changes the setting of the first communication condition C1 to promote the disconnection of the communication between the smartphone 1 and the colorimeter 2, the information indicating the second communication condition C2 is not displayed on the touch panel 12. Accordingly, a display of information unnecessary for the user on the touch panel 12 can be curbed. This improves user convenience.

Further, in the smartphone 1, the second communication condition C2 includes the third setting condition C21, and the fourth setting condition C22 that is a condition under which it is difficult for the colorimeter 2 to transition to the dormant state than with the third setting condition C21, and when the first setting unit 111 receives the first change operation P1, the first display control unit 115 causes the information indicating the second communication condition C2 to be displayed on the touch panel 12 when the second communication condition C2 is the third setting condition C21.

Accordingly, when the first setting unit 111 receives the first change operation P1, the first display control unit 115 causes the information indicating the second communication condition C2 to be displayed on the touch panel 12 when the second communication condition C2 is the third setting condition C21.

That is, when the user changes the setting of the first communication condition C1 to curb disconnection of the communication between the smartphone 1 and the colorimeter 2, the information indicating the second communication condition C2 is displayed on the touch panel 12 when the second communication condition C2 is the third setting condition C21. Thus, the user can easily confirm that the second communication condition C2 is the third setting condition C21. Therefore, the user can easily determine that it is necessary for the second communication condition C2 to be changed. The user can determine, for example, that change from the third setting condition C21 to the fourth setting condition C22 is necessary.

Further, in the smartphone 1, when the first setting unit 111 receives the first change operation P1, the first display control unit 115 does not cause the information indicating the second communication condition C2 to be displayed on the touch panel 12 when the second communication condition C2 is the fourth setting condition C22.

Accordingly, when the user changes the setting of the first communication condition C1 to curb disconnection of the communication between the smartphone 1 and the colorimeter 2, the information indicating the second communication condition C2 is not displayed on the touch panel 12 when the second communication condition C2 is the fourth setting condition C22. Accordingly, a display of information unnecessary for the user on the touch panel 12 can be curbed. This improves user convenience.

Further, in the smartphone 1, the second communication condition storage unit 118 is included, and the acquisition unit 112 acquires the second communication condition C2 from the colorimeter 2 in advance in initial communication with the colorimeter 2, and stores the second communication condition C2 in the second communication condition storage unit 118.

Accordingly, the acquisition unit 112 acquires the second communication condition C2 from the colorimeter 2 in advance in the initial communication with the colorimeter 2, and stores the second communication condition C2 in the second communication condition storage unit 118. Therefore, when the first setting unit 111 receives the first change operation P1, the second communication condition C2 can be easily acquired. This simplifies processing of the smartphone 1.

Further, the smartphone 1 includes the prohibition unit 114 that prohibits the colorimeter 2 from changing the second communication condition C2 through the operation with respect to the operation mechanism 22 included in the colorimeter 2 when the second communication condition C2 is the fourth setting condition C22.

Accordingly, the prohibition unit 114 prohibits the colorimeter 2 from changing the second communication condition C2 through the operation with respect to the operation mechanism 22 included in the colorimeter 2 when the second communication condition C2 is the fourth setting condition C22. This makes it possible, for example, to curb changing the second communication condition C2 from the fourth setting condition C22 to the third setting condition C21 through the operation with respect to the operation mechanism 22 included in the colorimeter 2. Therefore, it is possible to curb the disconnection of the communication between the smartphone 1 and the colorimeter 2.

Further, in the smartphone 1, when the first setting unit 111 receives the first change operation P1, the acquisition unit 112 acquires the second communication condition C2 from the colorimeter 2.

Accordingly, when the first setting unit 111 receives the first change operation P1, the acquisition unit 112 acquires the second communication condition C2 from the colorimeter 2. Therefore, the acquisition unit 112 can acquire the second communication condition C2 at an appropriate timing. Therefore, the user can appropriately determine whether or not it is necessary to change the second communication condition C2.

Further, the control system 100 according to the present embodiment is the control system 100 including the colorimeter 2 and the smartphone 1 that controls the colorimeter 2, the colorimeter 2 includes the second communication interface 25, the smartphone 1 includes the first communication interface 13 that communicates with the second communication interface 25, the first setting unit 111 that sets the first communication condition C1 that is a condition of transition of the first communication interface 13 from the active state in which the first communication interface 13 communicates with the colorimeter 2 to the dormant state in which the first communication interface 13 does not communicate with the colorimeter 2 in response to the operation from the user, the acquisition unit 112 that acquires from the colorimeter 2 the second communication condition C2, which is a condition of transition from the active state in which the second communication interface 25 communicates with the first communication interface 13 to the dormant state in which the second communication interface 25 does not communicate with the first communication interface 13, and the first display control unit 115 that controls the touch panel 12, wherein when the first setting unit 111 receives the first change operation P1, which is an operation for changing the setting of the first communication condition C1 so that it is difficult for the first communication interface 13 transitions from the active state to the dormant state, the first display control unit 115 causes the information indicating the second communication condition C2 to be displayed on the touch panel 12.

This provides the same effects as those of the smartphone 1 described above.

Further, the first control program PG1 according to the present embodiment causes the first processor 11A for controlling the first communication interface 13 communicating with the colorimeter 2 to function as the first setting unit 111 that sets the first communication condition C1 that is a condition of transition of the first communication interface 13 from the active state in which the first communication interface 13 communicates with the colorimeter 2 to the dormant state in which the first communication interface 13 does not communicate with the colorimeter 2 in response to the operation from the user, the acquisition unit 112 that acquires from the colorimeter 2 the second communication condition C2, which is a condition of transition from the active state in which the colorimeter 2 communicates with the first communication interface 13 to the dormant state in which the colorimeter 2 does not communicate with the first communication interface 13, and the first display control unit 115 that controls the touch panel 12, wherein when the first setting unit 111 receives the first change operation P1, which is an operation for changing the setting of the first communication condition C1 so that it is difficult for the first communication interface 13 transitions from the active state to the dormant state, the first display control unit 115 causes the information indicating the second communication condition C2 to be displayed on the touch panel 12.

Accordingly, the same effects as those of the smartphone 1 described above can be achieved.

The embodiment merely shows one specific example to which the present disclosure has been applied. The present disclosure is not limited to the configuration of the present embodiment, and can be implemented in various aspects without departing from the gist of the disclosure.

In the above-described embodiment, a case where the "control device" is the smartphone 1 has been described, but the embodiment is not limited thereto. The "control device" may be, for example, a personal computer or a tablet device.

In the above-described embodiment, a case where the "target device" is the colorimeter 2 has been described, but the embodiment is not limited thereto. The "target device" may be, for example, a printer or a projector.

In the above-described embodiment, a case where the first communication condition C1 specifies whether or not the smartphone 1 transitions to the sleep state when an operation from the user is not continuously received for a predetermined time or more has been described, but the embodiment is not limited thereto. The first communication condition C1 may specify whether or not the smartphone 1 transitions to the sleep state based on a remaining capacity of the first battery 14. For example, whether or not the smartphone 1 transitions to the sleep state when the remaining capacity of the first battery 14 falls to 20% or less may be specified.

In the above-described embodiment, a case where the second communication condition C2 specifies whether or not the colorimeter 2 transitions to the power saving state when the operation mechanism 22 does not continuously receive an operation from the user for a predetermined time or more has been described, but the embodiment is not limited thereto. The second communication condition C2 may specify whether or not the colorimeter 2 transitions to the power saving state based on the remaining capacity of the second battery 26. For example, the second communication condition C2 may specify whether or not the colorimeter 2 transitions to the power saving state when the remaining capacity of the second battery 26 falls to 10% or less.

In the above-described embodiment, a case where the smartphone 1 and the colorimeter 2 wirelessly communicate according to the Bluetooth (registered trademark) standard has been described, but the embodiment is not limited thereto. The smartphone 1 and the colorimeter 2 may wirelessly communicate according to a Wi-Fi (registered trademark) standard, for example. Further, the smartphone 1 and the colorimeter 2 may communicate by wire according to, for example, a USB standard or an Ethernet (registered trademark) standard.

The first processor 11A may be configured of a single processor or may be configured of a plurality of processors. The first processor 11A may also be hardware programmed to realize corresponding functional units. That is, the first processor 11A may be configured as, for example, an ASIC or an FPGA.

Each unit of the smartphone 1 illustrated in FIGS. 1 and 2 is merely an example, and a specific implementation form is not particularly limited. That is, it is not necessarily necessary to implement hardware individually corresponding to each unit, and it is also possible to realize the function of each unit by one processor executing a program. Further, some of functions realized by software in the above-described embodiment may be realized by hardware, or some of functions realized by hardware may be realized by software. Further, a specific detailed configuration of each unit of the smartphone 1 can also be arbitrarily changed.

Step units of the operation illustrated in FIGS. 7 and 8 are divided depending on main processing content in order to make it easy to understand the processing of the first control unit 11 of the smartphone 1, and the present disclosure is not limited by a manner in which the processing units are divided or names of the processing units. The processing units may be divided into more step units depending on the processing content. Further, one step unit may be further divided to include more processing. Further, the order of the steps may be appropriately replaced within the scope of the present disclosure.

What is claimed is:

1. A control device comprising:

a first communication unit configured to communicate with a target device;

a first setting unit configured to set a first communication condition, the first communication condition being a condition of transition of the first communication unit from an active state in which the first communication unit communicates with the target device to a dormant state in which the first communication unit does not communicate with the target device, in response to an operation from a user;

an acquisition unit configured to acquire a second communication condition from the target device, the second communication condition being a condition of transition from an active state in which the target device communicates with the first communication unit to a dormant state in which the target device does not communicate with the first communication unit; and a display control unit configured to control a display unit, wherein when the first setting unit receives a first change operation being an operation for changing a setting of the first communication condition to make it difficult for the first communication unit to transition from the active state to the dormant state, the display control unit causes the display unit to display information indicating the second communication condition.

2. The control device according to claim 1, wherein when the first setting unit receives a second change operation being an operation for changing the setting of the first communication condition to make it easy for the first communication unit to transition from the active state to the dormant state, the display control unit does not cause the display unit to display the information indicating the second communication condition.

3. The control device according to claim 1, wherein the second communication condition includes a first setting condition and a second setting condition, the second setting condition being a condition that makes it more difficult for the target device to transition to the dormant state than the first setting condition, and when the first setting unit receives the first change operation, in a case in which the second communication condition is the first setting condition, the display control unit causes the display unit to display the information indicating the second communication condition.

4. The control device according to claim 3, wherein when the first setting unit receives the first change operation, in a case in which the second communication condition is the second setting condition, the display control unit does not cause the display unit to display the information indicating the second communication condition.

5. The control device according to claim 3, further comprising a storage unit, wherein the acquisition unit acquires the second communication condition from the target device in advance in an initial communication with the target device, and causes the storage unit to store the second communication condition.

6. The control device according to claim 5, further comprising a prohibition unit configured to prohibit the target device from changing the second communication condition by operating an operation mechanism included in the target device when the second communication condition is the second setting condition.

7. The control device according to claim 1, wherein the acquisition unit acquires the second communication condition from the target device when the first setting unit receives the first change operation.

8. A control system comprising a target device and a control device configured to control the target device, wherein the target device includes a second communication unit, and the control device includes a first communication unit configured to communicate with the second communication unit;

a first setting unit configured to set a first communication condition, the first communication condition being a condition of transition of the first communication unit from an active state in which the first communication unit communicates with the target device to a dormant state in which the first communication unit does not communicate with the target device, in response to an operation from a user;

an acquisition unit configured to acquire a second communication condition from the target device, the second communication condition being a condition of transition from an active state in which the second communication unit communicates with the first communication unit to a dormant state in which the second communication unit does not communicate with the first communication unit; and a display control unit configured to control a display unit, and when the first setting unit receives a change operation being an operation for changing a setting of the first communication condition to make it difficult for the first communication unit to transition from the active state to the dormant state, the display control unit causes the display unit to display information indicating the second communication condition.

9. A non-transitory computer-readable storage medium storing a control program for causing a processor for controlling a first communication unit communicating with a target device to function as:

a first setting unit configured to set a first communication condition, the first communication condition being a condition of transition of the first communication unit from an active state in which the first communication unit communicates with the target device to a dormant state in which the first communication unit does not communicate with the target device, in response to an operation from a user;

an acquisition unit configured to acquire a second communication condition from the target device, the second communication condition being a condition of transition from an active state in which the target device communicates with the first communication unit to a dormant state in which the target device does not communicate with the first communication unit; and a display control unit configured to control a display unit, wherein when the first setting unit receives a change operation being an operation for changing a setting of the first communication condition to make it difficult for the first communication unit to transition from the active state to the dormant state, the display control unit causes the display unit to display information indicating the second communication condition.

* * * * *